United States Patent
Virgil et al.

(10) Patent No.: US 7,930,052 B2
(45) Date of Patent: Apr. 19, 2011

(54) AUTOMATED LOGISTICS SUPPORT SYSTEM INCORPORATING A PRODUCT INTEGRITY ANALYSIS SYSTEM

(75) Inventors: Kenneth W. Virgil, Tucson, AZ (US); Daniel A. Colica, Tucson, AZ (US); Mark E. Behrens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 729 days.

(21) Appl. No.: 11/562,750

(22) Filed: Nov. 22, 2006

(65) Prior Publication Data

US 2008/0120149 A1    May 22, 2008

(51) Int. Cl.
*G06F 19/00* (2006.01)
(52) U.S. Cl. .......... 700/105; 700/97; 700/107; 707/687
(58) Field of Classification Search .................... 700/97, 700/106, 107; 707/104.1, 687
See application file for complete search history.

(56) References Cited

U.S. PATENT DOCUMENTS

| | | | | |
|---|---|---|---|---|
| 4,858,146 A | * | 8/1989 | Shebini | 703/1 |
| 5,457,792 A | | 10/1995 | Virgil et al. | 707/3 |
| 5,493,679 A | * | 2/1996 | Virgil et al. | 707/104.1 |
| 5,737,532 A | | 4/1998 | DeLair et al. | 709/219 |
| 5,931,877 A | * | 8/1999 | Smith et al. | 701/29 |
| 5,950,190 A | | 9/1999 | Yeager et al. | |
| 6,110,213 A | * | 8/2000 | Vinciarelli et al. | 703/1 |
| 6,405,364 B1 | * | 6/2002 | Bowman-Amuah | 717/101 |
| 7,242,995 B1 | * | 7/2007 | Morgenson et al. | 700/103 |
| 2005/0288808 A1 | * | 12/2005 | Lopez et al. | 700/97 |
| 2006/0149770 A1 | | 7/2006 | Jang et al. | |

OTHER PUBLICATIONS

"Reliability and Maintainability Task Priorities", System Reliability Center, 2001 IIT Research Institute.*
"Reliability/Availability of Electrical and Mechanical Systems for Command, Control, Communications, Computer, Intelligence, Surveillance, and Reconnaissance Facilities", Headquarters, Department of the Army, Mar. 14, 2003.*
"How do I choose: MIL-HDBK-217 or Telcordia SR-332?", printed from http://www.t-cubed.com/faq_choose.htm, 2008.*
PCT Notification of Transmittal of the International Search Report and the Written Opinion of the International Searching Authority, or the Declaration, mailed Nov. 10, 2008, in re PCT/US07/84509 filed Nov. 13, 2007 (8 pages).

* cited by examiner

*Primary Examiner* — Michael D Masinick
(74) *Attorney, Agent, or Firm* — Baker Botts L.L.P.

(57) ABSTRACT

According to one embodiment of the invention, a computer implemented system includes an integrated logistics support system and a product integrity analysis system that utilize an integrated database. The product integrity analysis system is operable to retrieve at least a portion of logistics data records from the database, calculate an anticipated integrity value of the product using the portion of logistics data records, and store the anticipated integrity value of the product in the database.

19 Claims, 2 Drawing Sheets

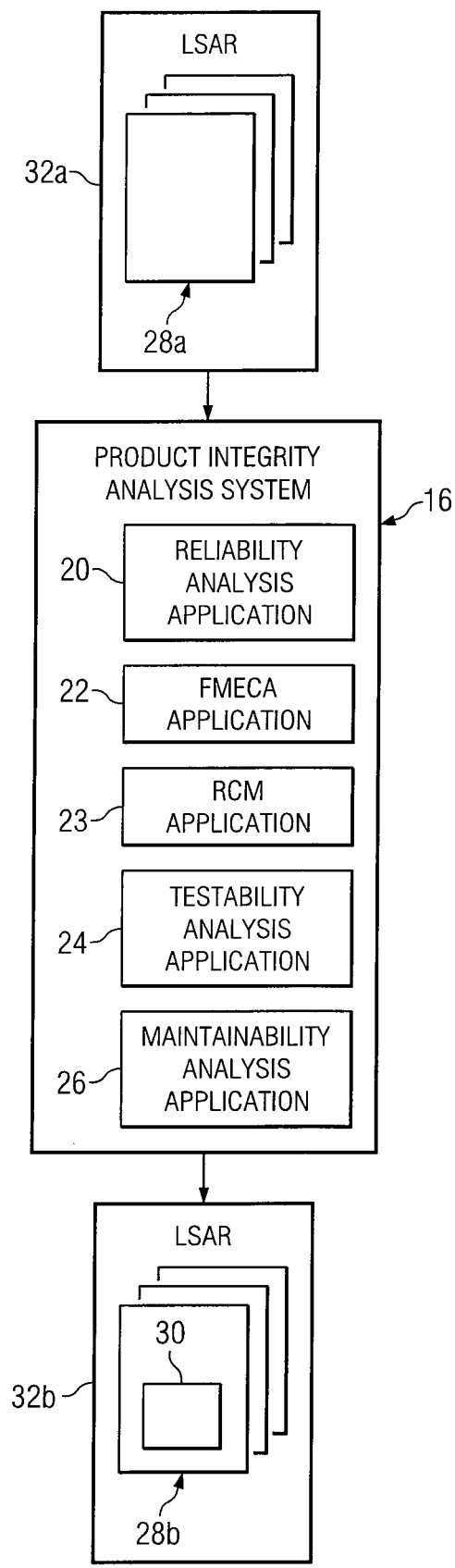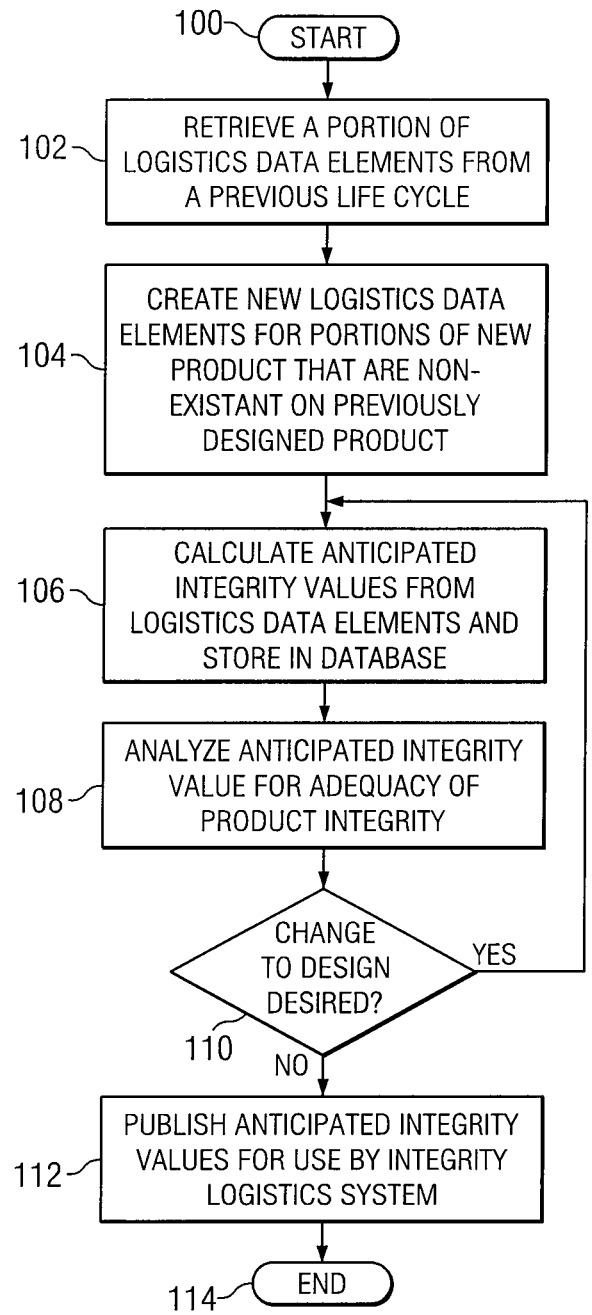

AUTOMATED LOGISTICS SUPPORT SYSTEM INCORPORATING A PRODUCT INTEGRITY ANALYSIS SYSTEM

TECHNICAL FIELD OF THE INVENTION

This invention generally relates to automated logistics support systems, and more particularly, to an automated logistics support system incorporating a product integrity analysis system and method of operating the same.

BACKGROUND OF THE INVENTION

Integrated logistics support (ILS) is referred to as a process that facilitates the management of a product throughout its life cycle. The concept of integrated logistics support was originally developed by the military sector of the government for the purpose of supporting various combat systems, such as weaponry, or various types of armament throughout their useful lifespan. More recently, however, integrated logistics support systems have been implemented by non-military organizations. The product supported by an integrated logistics support system may be any device or system, such as software, or an electrical, electro-mechanical, or mechanical product that may be designed by one or more development personnel and may be produced by the organization. The life cycle of the product may extend from inception phase to the serviceable life of the product and may include development and production phases. The design of the product may predominantly occur during the development phase of a life cycle. The production phase is entered into upon completion of the development phase and continues throughout the serviceable life of the product.

SUMMARY OF THE INVENTION

According to one embodiment of the invention, a computer implemented system includes an integrated logistics support system and a product integrity analysis system that utilize an integrated database. The product integrity analysis system is operable to retrieve at least a portion of logistics data records from the database, calculate an anticipated integrity value of the product using the portion of logistics data records, and store the anticipated integrity value of the product in the database.

According to another embodiment of the invention, a computer implemented method includes retrieving at least a portion of logistics data records from a database, calculating an anticipated integrity value, and storing the anticipated integrity value in the database. The anticipated integrity value is calculated using the portion of logistics data records. The portion of logistics data records are stored in the database as an integrated logistics support system.

Embodiments of the invention may provide numerous technical advantages. Some, none, or all embodiments may benefit from the below described advantages. According to one embodiment, potential errors resulting from communication between disparate databases may be alleviated. That is, translation of logistics data records and anticipated integrity values between the product integrity analysis system and integrated logistics support system may not be necessary because both utilize a common database according to certain embodiments. The integrated logistics support system incorporates a product integrity analysis system that is adapted to retrieve from and store calculated results in the database of the integrated logistics support system. Because the integrated logistics support system and product integrity analysis system may use a common database, translation of data between these two systems may not be necessary. Additionally, usage of an integrated database may allow users of the integrated logistics support system to immediately view results from the product integrity logistics system.

Other technical advantages will be apparent to one of skill in the art.

BRIEF DESCRIPTION OF THE DRAWINGS

A more complete understanding of embodiments of the invention will be apparent from the detailed description taken in conjunction with the accompanying drawings in which:

FIG. 3 is a block diagram of the product integrity analysis system of the embodiment of FIG. 1; and FIG. 4 is a flowchart showing several actions that may be performed in order to implement the embodiment of FIG. 1.

DETAILED DESCRIPTION OF EXAMPLE EMBODIMENTS OF THE INVENTION

Figure 1:
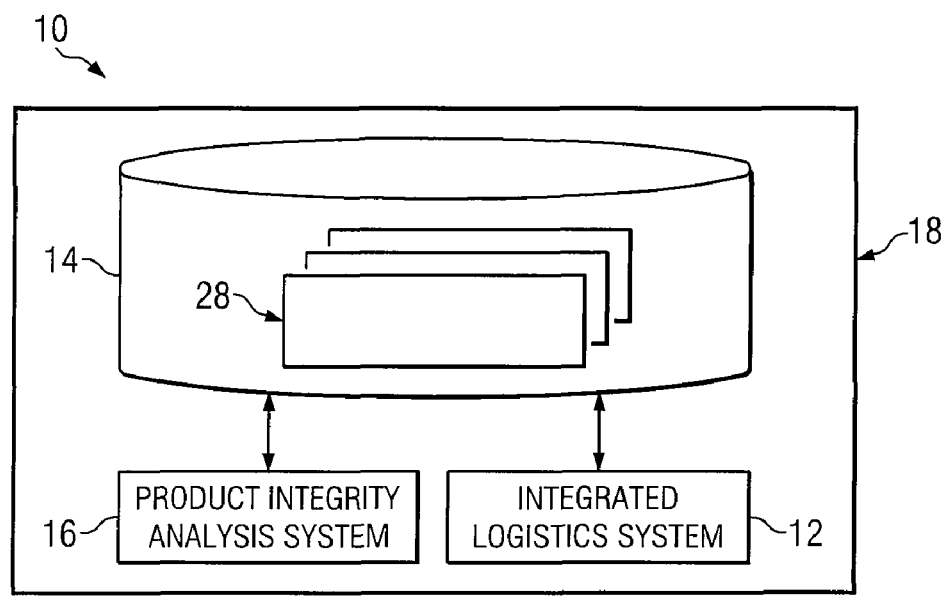
FIG. 1 is a block diagram of one embodiment of an integrated logistics support system incorporating a product integrity analysis system according to one embodiment of the present invention.

Embodiments of the invention are best understood by referring to FIGS. 1 through 4 of the drawings, like numerals being used for like and corresponding parts of the various drawings.

Product integrity analysis systems have been used during the development phase of a product's life cycle in order to identify weaknesses in the design of the product. Once identified, modifications may have been made to the design of the product in order to enhance the general robustness of the product. These product integrity analysis systems may have included applications or tools, such as reliability, maintainability, and/or testability (RMT) applications. These applications were generally mathematical modeling tools that produced anticipated integrity values for various portions of the product. These anticipated integrity values indicated the general robustness of the design of the product due to projected normal as well as abnormal use. Results from product integrity analysis applications have generally enabled development personnel to identify potential weaknesses in the product and make appropriate corrective action to the design of the product.

Development personnel skilled in the use of product integrity analysis systems may be generally referred to as systems engineers. On the other hand, personnel who are skilled in the concepts and use of integrated logistics support systems are generally referred to as logisticians. Logisticians may be primarily concerned with implementation of the product during the production phase of the product's life cycle.

Although the value of product integrity analysis systems has been known, access to results from these systems by skilled logisticians has been somewhat strained using conventional product integrity analysis systems. In some cases, this may have been due to lack of readily available results produced by the product integrity analysis system. This lack of readily available results may be due to several factors. For instance, anticipated integrity values may have been stored in a format that is not readily understood by logisticians. Conventional product integrity analysis systems have historically used databases for storage of results that are generally disparate to the type of databases used to store integrated logistics support system (ILS) information. In order to use resulting information provided by these product integrity analysis systems, results would have to be translated into a format native to the integrated logistics support system. This translation of data, whether manual or automated, usually resulted in inadvertent errors due to the translation process. Logisticians would also have to wait for completion of the translation in order to utilize information from these conventional product integrity analysis systems. If translation was not performed in a timely manner, users of the conventional integrated logistics support system would be further hindered from utilizing this information. Thus, the teachings of the present invention realize that it would be beneficial to provide a product integrity analysis system for an integrated logistics support system that provides anticipated integrity values that are readily understood by users of the integrated logistics support system, such as logisticians, in a timely manner.

FIG. 1 shows one embodiment of an automated logistics support system 10 that may provide a solution to the previously described problems with conventional product integrity analysis systems. The automated logistics support system 10 generally has an integrated logistics support system 12 and a database 14 for storage of logistics data records 28 associated with a life cycle of a product. According to the teachings of the invention, automated logistics support system 10 also has a product integrity analysis system 16 that is coupled to database 14 in order to retrieve logistics data records 28 from the database, perform product integrity calculations on this data, and store results of these calculations in database 14 for use by users of the integrated logistics support system 10. In this manner, results from product integrity analysis system 16 may be immediately available to users of the integrated logistics support system 12 upon generation of these results.

In one embodiment, product integrity analysis system 16 may retrieve logistics data records 28 directly from the database 14. In this manner, logisticians as well as users of the product integrity analysis system 16 may share a common repository for product data. In another embodiment, calculated results from the product integrity analysis system 16 may be stored in database 14 in a format native to the integrated logistics support system 12. Certain embodiments of the present invention may provide an advantage in that potential errors caused through translation of data shared between the two systems 12 and 16 may be alleviated. Additionally, skilled users of the integrated logistics support system 10 may have immediate view of calculated results from product integrity analysis system 16 thereby enabling these users to provide timely feedback during the development process of the product's life cycle.

The automated logistics support system 10 may be implemented on any suitable computer implemented system 18 that may be, for example, a network coupled computing system or a stand-alone computing system. The stand-alone computing system may be any suitable computing system, such as a personal computer, laptop computer, or mainframe computer capable of executing instructions necessary to implement the integrated logistics support system 12 and product integrity analysis system 16 according to the teachings of the present invention. The network computing system may be a number of computers coupled together via a network, such as a local area network (LAN), a metropolitan area network (MAN), or a wide area network (WAN). The automated logistics support system 10 implemented on a network computing system may allow several users, such as skilled users of the product integrity analysis system 16 to readily share results with skilled users of the integrated logistics support system 12.

Figure 2:
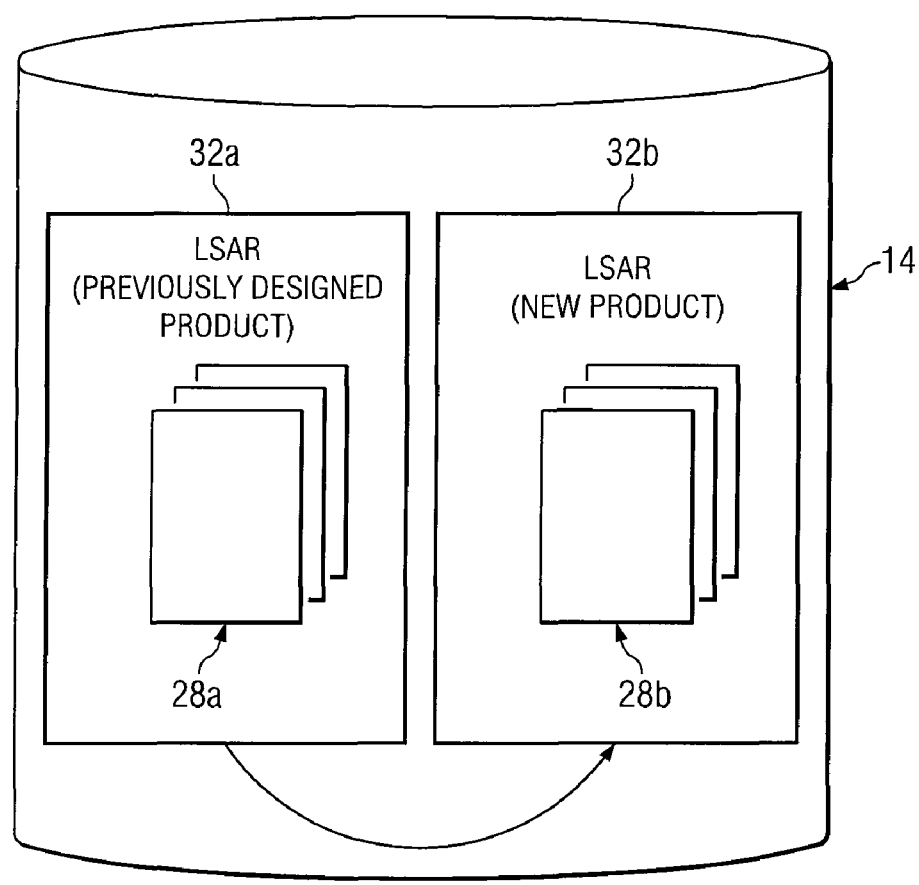
FIG. 2 is a block diagram of several logistics support analysis records that may be stored in the database of the embodiment of FIG. 1.

In one embodiment, integrated logistics support system 12 may be configured to produce logistics support analysis records (LSARs) 32a and 32b that are stored in database 14, as shown in FIG. 2. FIG. 2 is a block diagram of several logistics support analysis records that may be stored in database 14. Logistics support analysis record 32a may include several logistics data records 28a associated with a life cycle of a previously designed product. Logistics support analysis record 32 may exist for each product that is supported by the integrated logistics support system 12. As will be described in greater detail below, a new logistics support analysis record 32b may be created for a new product by copying several logistics data records 28a from logistical analysis data record 32a of a previously designed product. Moreover, these logistics data records 28a may be useful in providing information that may be used by product integrity analysis system 16.

Logistics data records 28a and 28b may be stored in logistics support analysis records 32a and 32b using any suitable industry standard format. In one embodiment, logistics data records 28a and 28b may be stored in the logistics support analysis record 32a and 32b according to a MIL-STD-1388-2B or DEF STAN 00-60 compliant format. MIL-STD-1388-2B and DEF STAN 00-60 compliant formats have been established by the military sector of the government as a means to classify and store product related information. In another embodiment, logistics data records 28a and 28b may be stored in the logistics support analysis record 32a and 32b according to a MIL-PRF-49506 Logistics Management Information (LMI) specification. In another embodiment, logistics data records 28a and 28b may be stored in the logistics support analysis record 32a and 32b according to the United Kingdom's Ministry of Defense (MoD) Defense Standard 00-60 (0060). In another embodiment, logistics data records 28a and 28b may be stored in the logistics support analysis record 32a and 32b according to the Government Electronics and Information Technology Association (GEIA) standard GEIA-STD-0007. This product related information may be used to facilitate logistical implementation of the product throughout it useful life cycle. A particular database compliant with either of the previously described industry standards may have a number of logistics data records 28 that may be logistical support analysis (LSA) data records. Certain embodiments of the present invention may provide an advantage in that a central repository is provided for users of the integrated logistics support system 12 and users of the product integrity analysis system 16 using an industry standard compliant logistics support analysis record 32. In this manner, potential errors to information caused by transferal from one system to another is alleviated. Additionally, results of the various integrity analyses is immediately available to skilled users of the integrated logistics support system 12.

FIG. 3 is a block diagram showing several components of product integrity analysis system 16. The product integrity analysis system 16 has a number of integrity analysis applications that may include a reliability analysis application 20, a failure mode effects and criticality analysis application 22, a reliability centered maintenance (RCM) application 23, a testability analysis application 24, and a maintainability analysis application 26. Logistics support analysis record 32a may have a number of logistics data records 28a that are retrievable by applications (20, 22, 23, 24, or 26). Product integrity analysis system 16 may produce one or more anticipated integrity values 30 that are stored in logistics support analysis record 32b of a new product. In one embodiment, anticipated integrity values 30 may be stored in one or more logistics data records 28b. The logistics data records 28a or 28b may each include information associated with particular portions of the product. For example, one particular logistics data record 28 may include information regarding a certain electronic component on a circuit card assembly that has been implemented on the product. This logistics data record 28 may include information such as product specifications for this electronic component, maximum operating conditions, nominal values, empirical failure rates, and other information that may be pertinent for calculating a resulting anticipated integrity value 30 for this component. Several logistics data records 28 associated with various components of the circuit card assembly may be retrieved by the product integrity analysis system 16 in order to calculate an overall anticipated integrity value 30 for the circuit card assembly. In a similar manner, logistics data records 28a associated with other portions of the product may be retrieved by the product integrity analysis system 16 in order to calculate anticipated integrity values 30 for various portions of the product.

Reliability analysis application 20 may be operable to calculate various anticipated integrity values 30 for the product. Reliability is referred to as the ability of a product to perform its intended function for a specified interval under specified conditions. The reliability analysis application 20 may be operable to calculate one or more anticipated integrity values 30, such as failure rate calculations, reliability modeling calculations, and generate various reports associated with these analyses. In one embodiment, reliability analysis application 20 may be operable to calculate an anticipated integrity analysis 30 on particular elements of the product that may be, for example, one or more failure rate calculations. In another embodiment, these anticipated integrity values 30 may be performed according to MIL-HDBK-217F, RAC Reliability Toolkit, Commercial Practices Edition, and/or Telcordia SR332.

Failure mode effects and criticality analysis application 22 may be operable to calculate various anticipated integrity values 30 including failure modes, failure effects, and criticality aspects of the product. Failure mode effects calculations involve the consequence of the mechanism through which the failure occurs and the consequence of a failure mode and its frequency of occurrences. Failure mode effects and criticality analysis application 22 may be operable to calculate various anticipated integrity values 30, such as failure mode effects and criticality analysis, and generate reports associated with these analyses. As with reliability analysis application 20, failure mode effects and criticality analysis application 22 may be operable to calculate failure mode criticality and item criticality for various elements of the product. Since failure mode effects and criticality analysis may differ from reliability analysis according to the type of delineation of elements that make up the product, the failure mode effects and criticality analysis application 22 may be able to store failure rate data independently of reliability analysis applications 20. For example, reliability analysis application 20 may calculate failure rate data for individual electronic components of a circuit card while failure mode effects and criticality analysis application 22 may include separate failure rates in order to continue the failure mode effects and criticality analysis process independent of the reliability engineering process. Thus, the product integrity analysis system 16 may provide for storage of failure rate values as individual anticipated integrity values 30 or as one derived anticipated integrity value 30 for use by the integrated logistics support system 12.

Reliability centered maintenance application 23 may be operable to calculate various integrity values 30 including maintenance requirements, resource utilization, and the identification of engineering deficiencies. Reliability Centered Maintenance is generally a type of disciplined logic or methodology used to identify one or more preventive maintenance tasks. These preventative maintenance tasks may serve to realize the inherent reliability of equipment using the least expenditure of resources in some embodiments. Reliability centered maintenance application 23 may be operable to calculate various anticipated integrity values 30, such as applicability and effectivity of servicing tasks, on-condition tasks, hard time tasks, failure finding tasks, combination tasks, redesign, and generate reports associated with these analyses. In one embodiment, reliability centered maintenance application 23 may be operable to calculate effectivity of servicing tasks for various elements of the product. In another embodiment, these anticipated integrity values 30 may be performed according to industry standards and specifications such as MIL-HDBK-2173(AS), ATA MSG-3, NAVAIR 00-25-403, and/or MIL-STD-1843.

Testability analysis application 24 may be operable to calculate various testability aspects of the product. Testability is a design characteristic that allows the operational status of the product to be determined and isolation of faults within the product to be performed in a timely manner. Testability analysis application 24 may be operable to calculate various anticipated integrity values 30, such as detection group values, built-in-test procedures for failure modes, identification of parts that a failure mode can be isolated to, and testability failure rates.

Maintainability analysis application 26 may be operable to calculate various maintainability aspects of the product. Maintainability is generally regarded as the ability of an item to be retained in or restored to a specified condition when maintenance is performed by personnel having specified skill levels, using prescribed procedures and resources, at each prescribed level of maintenance and repair. In one embodiment, maintainability analysis application 26 provides capabilities to define various scenarios and perform analyses using industry standards and specifications, such as those described in Procedure 2 or Procedure 5 of MIL-STD-472. Maintainability analysis application 26 may be operable to calculate various anticipated integrity values 30, such as availability, mean man hours of usage, mean time to repair, and mean maximum maintenance time for both corrective and preventative maintenance. Additionally, maintainability analysis application 26 may generate reports associated with these analyses. In another embodiment, anticipated integrity analyses may be corrective maintenance or preventative maintenance procedures as specified by industry standards and specifications, such as those described in paragraphs 1.4.2 and 1.4.3 respectively in MIL-HDBK-472.

FIG. 4 shows a flowchart depicting a series of actions that may be performed by the integrated logistics support system 10 to implement various aspects and features of the present invention. In act 100, the integrated logistics support system 10 is initiated. The integrated logistics support system 10 may be initialized by launching integrated logistics support system 12 and/or product integrity analysis system 16 on computing system 10. In act 102, a number of logistics data records 28a may be retrieved from a logistics support analysis record 32a of a previous life cycle. These logistics data records 28a may include various types of information gathered during the life cycle of a previously designed product. In one embodiment, another logistics support analysis record 32b may be created for a new product design. This new product design, however, may re-use several design components from a previously designed product. Usage of information from elements common to both the previously designed product and the new product enables a relatively more accurate estimation arrived at in a shorter period of time than would otherwise have been achieved if no information had been imported from a previous life cycle. In this manner, a relatively fast and accurate estimation of anticipated integrity may be provided by using information from past performance of these various re-used elements. In act 104, new logistics data records 28b may be created for various elements of the new life cycle that are not common to the previously designed product. These logistics data records 28b may be associated with elements of the new product not common to the previously designed product. Thus, by implementation of acts 102 and 104, a logistics support analysis record 32b may be generated for the new product. Empirical information accumulated through the life cycle of a previously designed product that may be stored in logistics data records 28a may aid in deriving a relatively accurate estimation of the anticipated integrity of the new design. In one embodiment, this empirical information may be obtained from logistics support analysis record 28a.

In act 106, applications 20, 22, 23, 24, and 26 may be executed in order to calculate one or more anticipated integrity values 30 for the product in the development phase of its life cycle. These anticipated integrity values 30 may be stored as logistics data records 28b in logistics support analysis record 32b. In act 108, the anticipated integrity values 30 may be analyzed for adequacy of product integrity. That is, the anticipated integrity values 30 may be compared with one or more prescribed design goals. Users skilled in the usage of product integrity analysis systems 16 may utilize this information to ensure the anticipated integrity of the product. Logisticians may also use these anticipated integrity values 30 to verify that the product may adequately perform its intended function throughout its life cycle. Thus in act 110, users skilled in the usage of product integrity analysis systems 16 as well as users skilled in the usage of integrated logistics support systems 12 may provide feedback to the design process during the development phase of the product. If desired, either of these users may request one or more changes to the design of the product. If changes to the design of the product are made, acts 106 and 108 may again be performed using information associated with these design changes to verify the one or more prescribed design goals. Thus, acts 106, 108, and 110 may be performed any number of times in order to iteratively enhance the anticipated integrity of the product.

Once the anticipated integrity values 30 are acceptable, the logistics support analysis record 32b for the new product and their associated anticipated integrity values 30 may be published for use by the integrated logistics support system 12 in the production stage of the product's life cycle in act 112. Throughout the production phase of the product's life cycle, empirical data obtained through use of product may be recorded in logistics support analysis record 32b to provide enhanced accuracy for future calculations of anticipated integrity values 30 of future product designs. In act 114, the integrated logistics support system 10 may be terminated by stopping the integrated logistics support system 12 and/or product integrity analysis system 16. The one or more logistics data records 28 may remain persistent in database 14 and thus future initiations of integrated logistics support system 10 as described with reference to act 100 may enable usage of logistics data records 28 according to the above described procedure.

Thus, an integrated logistics support 10 has been described that incorporates a product integrity analysis system 16 using database 14 for storage of anticipated integrity values 30. Using this configuration, logistics data records 28 created by product integrity analysis system 16 are stored in a format native to the integrated logistics support system 12 and are thus immediately viewable by skilled users of the integrated logistics support system 12. Skilled users of the integrated logistics support system 12 such as logisticians may therefore be able to provide meaningful feedback to the life cycle of a product during its development phase.

Although several embodiments have been illustrated and described in detail, it will be recognized that substitutions and alterations are possible without departing from the spirit and scope of the present invention, as defined by the following claims.

What is claimed is:

1. A computer implemented system comprising:
an integrated logistics support system having a database for storage of a first plurality of logistics data records associated with a previously designed product, the first plurality of logistics data records being stored in a first logistical support analysis record that is compliant with a standard selected from the group consisting of MIL-STD-1388-2B, MIL-PRF-49506, United Kingdom Ministry of Defense Standard 00-60 (0060), and Government Electronics and Information Technology Association standard GEIA-STD-0007;
one or more product integrity analysis applications selected from the group consisting of a reliability analysis application, a failure mode effects and criticality analysis application, a reliability centered maintenance application, a maintainability analysis application, and a testability analysis application, the one or more product integrity analysis applications coupled to the integrated logistics support system and operable to:
retrieve at least a portion of the first plurality of logistics data records from the first logistical support analysis record of a the previously designed product;
create a new plurality of logistics data records for a new product, the new plurality of logistics data records being associated with one or more elements of the new product not common to the previously designed product;
calculate an anticipated integrity value of the new product using the retrieved portion of the first plurality of logistics data records;
create a second logistical support analysis record comprising the calculated anticipated integrity value; and
store the second logistical support analysis record in the database for view by users of the integrated logistics support system.

2. The computer implemented system of claim 1, wherein the reliability analysis application is operable to calculate an anticipated reliability according to a standard selected from the group consisting of MIL-HDBK-217F, RAC Reliability Toolkit, Commercial Practices Edition, and Telcordia SR332.

3. The computer implemented system of claim 1, wherein the database is a relational database.

4. A computer implemented system comprising:
an integrated logistics support system having a database for storage of a first plurality of logistics data records associated with a previously designed product, the first plurality of logistics data records being stored in a first logistical support analysis record;
a product integrity analysis system that is coupled to the integrated logistics support system and operable to:
retrieve at least a portion of the first plurality of logistics data records from the database;
create a new plurality of logistics data records for a new product, the new plurality of logistics data records being associated with one or more elements of the new product not common to the previously designed product;

calculate an anticipated integrity value of the product using the portion of the first plurality of logistics data records;

create a second logistical support analysis record comprising the calculated anticipated integrity value; and store the second logistical support analysis record in the database.

5. The computer implemented system of claim 4, wherein the portion of the first plurality of logistics data records are obtained from a previously designed product.

6. The computer implemented system of claim 4, wherein the integrated logistics support system is compliant with a standard selected from the group consisting of MIL-STD-1388-2B, MIL-PRF-49506, United Kingdom Ministry of Defense Standard 00-60 (0060), and Government Electronics, and Information Technology Association standard GEIA-STD-0007.

7. The computer implemented system of claim 6, wherein the database is a relational database.

8. The computer implemented system of claim 4, wherein the product analysis system comprises a reliability analysis application, the reliability analysis application being operable to calculate an anticipated reliability of the product using the portion of the first plurality of logistics data records.

9. The computer implemented system of claim 8, wherein the reliability analysis application is operable to calculate an anticipated reliability according a standard selected from the group consisting of MIL-HDBK-217F, RAC Reliability Toolkit, Commercial Practices Edition, and Telcordia SR332.

10. The computer implemented system of claim 4, wherein the product analysis system comprises a failure mode effects and criticality analysis application, the failure mode effects and criticality analysis application being operable to calculate an anticipated failure mode effects and criticality of the product using the portion of the first plurality of logistics data records.

11. The computer implemented system of claim 4, wherein the product analysis system comprises a reliability centered maintenance application, the reliability centered maintenance application being operable to calculate at least one maintenance task for the product using the portion of the first plurality of logistics data records.

12. The computer implemented system of claim 4, wherein the product analysis system comprises a testability analysis application, the testability analysis application being operable to calculate an anticipated testability of the product using the portion of the first plurality of logistics data records.

13. The computer implemented system of claim 4, wherein the product analysis system comprises a maintainability analysis application, the maintainability analysis application being operable to calculate an anticipated maintainability of the product using the portion of the first plurality of logistics data records.

14. A computer implemented method comprising:

retrieving by one or more product integrity analysis applications at least a portion of a first plurality of logistics data records from a database of an integrated logistics support system, the first plurality of logistics data records being stored in a first logistical support analysis record;

creating a new plurality of logistics data records for a new life cycle, the new plurality of logistics data records being associated with one or more elements of a new product not common to a previous life cycle;

calculating by the one or more product integrity analysis applications an anticipated integrity value of a product using the portion of the first plurality of logistics data records;

creating a second logistical support analysis record comprising the calculated anticipated integrity value of the product; and storing the second logistical support analysis record in the database.

15. The computer implemented method of claim 14, wherein retrieving at least a portion of a first plurality of logistics data records from a database of an integrated logistics support system further comprises deriving a first plurality of logistics data records from a previous life cycle.

16. The computer implemented method of claim 14, further comprising analyzing the anticipated integrity of the product during a development phase of a new life cycle.

17. The computer implemented method of claim 15, further comprising providing corrective action for the product during the development phase of the new life cycle.

18. The computer implemented method of claim 14, wherein retrieving at least a portion of a plurality of logistics data records from a database of an integrated logistics support system further comprises retrieving at least a portion of a first plurality of logistics data records from a database that is compliant with a standard selected from the group consisting of a MIL-STD-1388-2B, MIL-PRF-49506, United Kingdom Ministry of Defense Standard 00-60 (0060), and Government Electronics, and Information Technology Association standard GEIA-STD-0007 compliant integrated logistics support system.

19. The computer implemented method of claim 14, wherein the one or more product integrity analysis applications is selected from the group comprising a reliability analysis application, a failure mode effects and criticality analysis application, a reliability centered maintenance application, a maintainability analysis application, and a testability analysis application.

* * * * *